United States Patent [19]

Kamioka

[11] Patent Number: 5,610,727
[45] Date of Patent: Mar. 11, 1997

[54] APPARATUS FOR DETECTING COORDINATES OF CHANGING POINTS IN BINARY IMAGE SIGNALS

[75] Inventor: Keiko Kamioka, Tokyo, Japan

[73] Assignee: NEC Corporation, Tokyo, Japan

[21] Appl. No.: 449,265

[22] Filed: May 24, 1995

[30] Foreign Application Priority Data

May 24, 1994 [JP] Japan .................................. 6-132460

[51] Int. Cl.⁶ .................................................. H04N 1/419
[52] U.S. Cl. ...................................... 358/448; 358/261.1
[58] Field of Search ................................... 358/448, 426, 358/261.1–261.3, 432–433; 382/185, 196, 204

[56] References Cited

U.S. PATENT DOCUMENTS

| | | |
|---|---|---|
| 4,245,257 | 1/1981 | Yamazaki et al. ...................... 358/260 |
| 4,254,438 | 3/1981 | Yamazaki et al. .................. 358/261.1 |

*Primary Examiner*—Stephen Brinich
*Attorney, Agent, or Firm*—Sughrue, Mion, Zinn, Macpeak & Seas

[57] ABSTRACT

A binary image signal is subdivided into blocks binary a size of "n", and coordinates of changing points of the binary image signal are detected within each of these subdivided blocks. A changing-point table is employed which stores therein a set of changing-point coordinates for each of all bit patterns produceable by the block having the size of "n". Also, an index table is provided which stores therein an initial address of the changing-point table into which the changing-point coordinate set corresponding to each bit pattern of these produceable bit patterns has been stored. A serial/parallel converter comments the binary image signal into the blocks having the size of "n". This block with the size of "n" is supplied to the index table, and an initial address corresponding to the inputted block is outputted from the index table. Based on this initial address, an address generating circuit reads a changing-point coordinate within the block from the changing-point table. The parallel/serial converter converts this read changing-point coordinate into a changing-point within a horizontal scanning line.

6 Claims, 9 Drawing Sheets

FIG. 1

| INPUT DATA | CHANGING POINT BIT NUMBER |
|---|---|
| 0 0 0 0 | F |
| 0 0 0 1 | 4 |
| 0 0 1 0 | 3、4 |
| 0 0 1 1 | 3 |
| 0 1 0 0 | 2、3 |
| 0 1 0 1 | 2、3、4 |
| 0 1 1 0 | 2、4 |
| 0 1 1 1 | 2 |
| 1 0 0 0 | 2 |
| 1 0 0 1 | 2、4 |
| 1 0 1 0 | 2、3、4 |
| 1 0 1 1 | 2、3 |
| 1 1 0 0 | 3 |
| 1 1 0 1 | 3、4 |
| 1 1 1 0 | 4 |
| 1 1 1 1 | F |

FIG. 3

| INPUT | OUTPUT(x) |
|-------|-----------|
| 0 0 0 0 | 0 0 0 0 0 0 |
| 0 0 0 1 | 0 0 0 0 0 1 |
| 0 0 1 0 | 0 0 0 0 1 1 |
| 0 0 1 1 | 0 0 0 1 1 0 |
| 0 1 0 0 | 0 0 1 0 0 0 |
| 0 1 0 1 | 0 0 1 0 1 1 |
| 0 1 1 0 | 0 0 1 1 1 1 |
| 0 1 1 1 | 0 1 0 0 1 0 |
| 1 0 0 0 | 0 1 0 1 0 0 |
| 1 0 0 1 | 0 1 0 1 1 0 |
| 1 0 1 0 | 0 1 1 0 0 1 |
| 1 0 1 1 | 0 1 1 1 0 1 |
| 1 1 0 0 | 1 0 0 0 0 0 |
| 1 1 0 1 | 1 0 0 0 1 0 |
| 1 1 1 0 | 1 0 0 1 0 1 |
| 1 1 1 1 | 1 0 0 1 1 1 |

FIG. 4

| ADDRESS | CHANGING POINT BIT NUMBER(y) | ADDRESS | CHANGING POINT BIT NUMBER(y) |
|---------|------------------------------|---------|------------------------------|
| 0 0 0 0 0 0 | F | 0 1 0 1 0 0 | 2 |
| 0 0 0 0 0 1 | 4 | 0 1 0 1 0 1 | F |
| 0 0 0 0 1 0 | F | 0 1 0 1 1 0 | 2 |
| 0 0 0 0 1 1 | 3 | 0 1 0 1 1 1 | 4 |
| 0 0 0 1 0 0 | 4 | 0 1 1 0 0 0 | F |
| 0 0 0 1 0 1 | F | 0 1 1 0 0 1 | 2 |
| 0 0 0 1 1 0 | 3 | 0 1 1 0 1 0 | 3 |
| 0 0 0 1 1 1 | F | 0 1 1 0 1 1 | 4 |
| 0 0 1 0 0 0 | 2 | 0 1 1 1 0 0 | F |
| 0 0 1 0 0 1 | 3 | 0 1 1 1 0 1 | 2 |
| 0 0 1 0 1 0 | F | 0 1 1 1 1 0 | 3 |
| 0 0 1 0 1 1 | 2 | 0 1 1 1 1 1 | F |
| 0 0 1 1 0 0 | 3 | 1 0 0 0 0 0 | 3 |
| 0 0 1 1 0 1 | 4 | 1 0 0 0 0 1 | F |
| 0 0 1 1 1 0 | F | 1 0 0 0 1 0 | 3 |
| 0 0 1 1 1 1 | 2 | 1 0 0 0 1 1 | 4 |
| 0 1 0 0 0 0 | 4 | 1 0 0 1 0 0 | F |
| 0 1 0 0 0 1 | F | 1 0 0 1 0 1 | 4 |
| 0 1 0 0 1 0 | 2 | 1 0 0 1 1 0 | F |
| 0 1 0 0 1 1 | F | 1 0 0 1 1 1 | F |

FIG. 7

| INPUT | | OUTPUT (x) | INPUT | | OUTPUT (x) |
|---|---|---|---|---|---|
| 0 | 0 0 0 0 | 0 0 0 0 0 0 0 | 1 | 0 0 0 0 | 1 0 0 0 0 0 0 |
| 0 | 0 0 0 1 | 0 0 0 0 0 0 1 | 1 | 0 0 0 1 | 1 0 0 0 0 1 0 |
| 0 | 0 0 1 0 | 0 0 0 0 0 1 1 | 1 | 0 0 1 0 | 1 0 0 0 1 0 1 |
| 0 | 0 0 1 1 | 0 0 0 0 1 1 0 | 1 | 0 0 1 1 | 1 0 0 1 0 0 1 |
| 0 | 0 1 0 0 | 0 0 0 1 0 0 0 | 1 | 0 1 0 0 | 1 0 0 1 1 0 0 |
| 0 | 0 1 0 1 | 0 0 0 1 0 1 1 | 1 | 0 1 0 1 | 1 0 1 0 0 0 0 |
| 0 | 0 1 1 0 | 0 0 0 1 1 1 1 | 1 | 0 1 1 0 | 1 0 1 0 1 0 1 |
| 0 | 0 1 1 1 | 0 0 1 0 0 1 0 | 1 | 0 1 1 1 | 1 0 1 1 0 0 1 |
| 0 | 1 0 0 0 | 0 0 1 0 1 0 0 | 1 | 1 0 0 0 | 1 0 1 1 1 0 1 |
| 0 | 1 0 0 1 | 0 0 1 0 1 1 0 | 1 | 1 0 0 1 | 1 1 0 0 0 0 0 |
| 0 | 1 0 1 0 | 0 0 1 1 0 0 1 | 1 | 1 0 1 0 | 1 1 0 0 1 0 0 |
| 0 | 1 0 1 1 | 0 0 1 1 1 0 1 | 1 | 1 0 1 1 | 1 1 0 1 0 0 1 |
| 0 | 1 1 0 0 | 0 1 0 0 0 0 0 | 1 | 1 1 0 0 | 1 1 0 1 1 0 1 |
| 0 | 1 1 0 1 | 0 1 0 0 0 1 0 | 1 | 1 1 0 1 | 1 1 1 0 0 0 0 |
| 0 | 1 1 1 0 | 0 1 0 0 1 0 1 | 1 | 1 1 1 0 | 1 1 1 0 1 0 0 |
| 0 | 1 1 1 1 | 0 1 0 0 1 1 1 | 1 | 1 1 1 1 | 1 1 1 0 1 1 1 |

FIG. 8A

| ADDRESS | CHANGING POINT BIT NUMBER (y) | ADDRESS | CHANGING POINT BIT NUMBER (y) |
|---|---|---|---|
| 0 0 0 0 0 0 0 | F | 0 0 1 0 1 0 0 | 2 |
| 0 0 0 0 0 0 1 | 4 | 0 0 1 0 1 0 1 | F |
| 0 0 0 0 0 1 0 | F | 0 0 1 0 1 1 0 | 2 |
| 0 0 0 0 0 1 1 | 3 | 0 0 1 0 1 1 1 | 4 |
| 0 0 0 0 1 0 0 | 4 | 0 0 1 1 0 0 0 | F |
| 0 0 0 0 1 0 1 | F | 0 0 1 1 0 0 1 | 2 |
| 0 0 0 0 1 1 0 | 3 | 0 0 1 1 0 1 0 | 3 |
| 0 0 0 0 1 1 1 | F | 0 0 1 1 0 1 1 | 4 |
| 0 0 0 1 0 0 0 | 2 | 0 0 1 1 1 0 0 | F |
| 0 0 0 1 0 0 1 | 3 | 0 0 1 1 1 0 1 | 2 |
| 0 0 0 1 0 1 0 | F | 0 0 1 1 1 1 0 | 3 |
| 0 0 0 1 0 1 1 | 2 | 0 0 1 1 1 1 1 | F |
| 0 0 0 1 1 0 0 | 3 | 0 1 0 0 0 0 0 | 3 |
| 0 0 0 1 1 0 1 | 4 | 0 1 0 0 0 0 1 | F |
| 0 0 0 1 1 1 0 | F | 0 1 0 0 0 1 0 | 3 |
| 0 0 0 1 1 1 1 | 2 | 0 1 0 0 0 1 1 | 4 |
| 0 0 1 0 0 0 0 | 4 | 0 1 0 0 1 0 0 | F |
| 0 0 1 0 0 0 1 | F | 0 1 0 0 1 0 1 | 4 |
| 0 0 1 0 0 1 0 | 2 | 0 1 0 0 1 1 0 | F |
| 0 0 1 0 0 1 1 | F | 0 1 0 0 1 1 1 | F |

FIG. 8B

| ADDRESS | CHANGING POINT BIT NUMBER (y) | ADDRESS | CHANGING POINT BIT NUMBER (y) |
|---|---|---|---|
| 1 0 0 0 0 0 0 | 1 | 1 0 1 1 1 0 1 | 1 |
| 1 0 0 0 0 0 1 | F | 1 0 1 1 1 1 0 | 2 |
| 1 0 0 0 0 1 0 | 1 | 1 0 1 1 1 1 1 | F |
| 1 0 0 0 0 1 1 | 4 | 1 1 0 0 0 0 0 | 1 |
| 1 0 0 0 1 0 0 | F | 1 1 0 0 0 0 1 | 2 |
| 1 0 0 0 1 0 1 | 1 | 1 1 0 0 0 1 0 | 4 |
| 1 0 0 0 1 1 0 | 3 | 1 1 0 0 0 1 1 | F |
| 1 0 0 0 1 1 1 | 4 | 1 1 0 0 1 0 0 | 1 |
| 1 0 0 1 0 0 0 | F | 1 1 0 0 1 0 1 | 2 |
| 1 0 0 1 0 0 1 | 1 | 1 1 0 0 1 1 0 | 3 |
| 1 0 0 1 0 1 0 | 3 | 1 1 0 0 1 1 1 | 4 |
| 1 0 0 1 0 1 1 | F | 1 1 0 1 0 0 0 | F |
| 1 0 0 1 1 0 0 | 1 | 1 1 0 1 0 0 1 | 1 |
| 1 0 0 1 1 0 1 | 2 | 1 1 0 1 0 1 0 | 2 |
| 1 0 0 1 1 1 0 | 3 | 1 1 0 1 0 1 1 | 3 |
| 1 0 0 1 1 1 1 | F | 1 1 0 1 1 0 0 | F |
| 1 0 1 0 0 0 0 | 1 | 1 1 0 1 1 0 1 | 1 |
| 1 0 1 0 0 0 1 | 2 | 1 1 0 1 1 1 0 | 3 |
| 1 0 1 0 0 1 0 | 3 | 1 1 0 1 1 1 1 | F |
| 1 0 1 0 0 1 1 | 4 | 1 1 1 0 0 0 0 | 1 |
| 1 0 1 0 1 0 0 | F | 1 1 1 0 0 0 1 | 3 |
| 1 0 1 0 1 0 1 | 1 | 1 1 1 0 0 1 0 | 4 |
| 1 0 1 0 1 1 0 | 2 | 1 1 1 0 0 1 1 | F |
| 1 0 1 0 1 1 1 | 4 | 1 1 1 0 1 0 0 | 1 |
| 1 0 1 1 0 0 0 | F | 1 1 1 0 1 0 1 | 4 |
| 1 0 1 1 0 0 1 | 1 | 1 1 1 0 1 1 0 | F |
| 1 0 1 1 0 1 0 | 2 | 1 1 1 0 1 1 1 | 1 |
| 1 0 1 1 1 0 0 | F | 1 1 1 1 0 0 0 | F |

APPARATUS FOR DETECTING COORDINATES OF CHANGING POINTS IN BINARY IMAGE SIGNALS

BACKGROUND OF THE INVENTION

The present invention generally relates to a binary image signal processing apparatus. More specifically, the present invention is directed to an apparatus capable of detecting coordinates of changing points in input binary image signals at high speeds, required when the binary image signals such as facsimile signals are data-compressed.

In general, to shorten data transfer time periods and also to reduce storage capacities of binary image data, various binary image data compressing systems have been widely utilized. The modified Huffman coding system and the modified READ system are known as the typical image data compressing system. In any of these data compressing systems, coordinates of changing points contained in binary image signals must be detected. That is, detections should be made of coordinates of pixels of binary images, which are transferred from white to black, or from black to white. Conventionally, the detection of this changing point is carried out by comparing the present pixel value with the preceding pixel value, as described in U.S. Pat. No. 4,245, 257.

The above-described conventional changing point detecting system has a problem in that since the changing point detecting process is performed on a bit by bit basis, lengthy detecting time is necessarily required. As a consequence, this changing point detecting system causes the binary image signal coding speeds to be lowered.

SUMMARY OF THE INVENTION

The present invention has been made to solve the above-described problem, and therefore has an object to provide an apparatus capable of detecting changing points of binary image at high speeds.

According to one aspect of the present invention, there is provided an apparatus capable of detecting a coordinate of a point where a value of a binary image signal is changed, comprising:

subdividing means for subdividing the binary image signal into blocks having a constant size, thereby outputting blocks of the binary image signal;

detecting means for comparing a value of the head pixel in one block of said binary image signal with a value of a last pixel in another block located just before said one block, thereby outputting a detection signal for indicating whether or not said head pixel value is coincident with said last pixel value;

a changing-point table having a substorage region for storing therein a set of changing-point coordinates within a block as to each of all bit patterns produceable by said binary image signal blocks, except for a coordinate of a head bit of said bit pattern;

an index table for storage therein an initial address of the substorage region of said changing-point table into which said changing-point coordinate set corresponding to the bit pattern has been stored as to each of all bit patterns produceable by said blocks, and for outputting the initial address when said binary image signal block is supplied from said subdividing means, said initial address corresponding to a bit pattern of said supplied binary image signal block;

changing-point coordinate outputting means for outputting a coordinate value within a block, which indicates that a head pixel is a changing point, as a changing-point coordinate value when the detection signal derived from said detecting means represents "coincidence", and for producing an address used to access to said changing-point table based on said initial address derived from said index table, and also for reading a changing-point coordinate set corresponding to the bit pattern of the block supplied to said index table, thereby outputting said read changing-point coordinate set as a coordinate value of a changing point within a block; and converting means for converting said changing-point coordinate value derived from said changing-point coordinate outputting means into a changing-point coordinate of said binary image signal.

According to another aspect of the present invention, there is provided an apparatus capable of detecting a coordinate of a point where a value of a binary image signal is changed, comprising:

subdividing means for subdividing the binary image signal into blocks having a constant size, thereby outputting blocks of the binary image signal;

detecting means for comparing a value of a head pixel in one block of said binary image signal with a value of a last pixel in another block located just before said one block, thereby outputting a detection signal for indicating whether or not said head pixel value is coincident with said last pixel value;

a changing-point table having a substorage region for storing therein a first set of changing-point coordinates within a block as to each of all bit patterns produceable by said binary image signal blocks, except for a coordinate of a head bit of said bit pattern, and another storage region for storing therein a second set of changing-point coordinates within a block as to each of all bit patterns produceable by said binary image signal blocks containing a head bit coordinate of said bit pattern;

an index table including a region for storing therein an initial address of the substorage region of said changing-point table into which said first changing-point coordinate set corresponding to the bit pattern has been stored as to each of all bit patterns produceable, by said blocks, and another region for storing therein another initial address of the substorage region of said changing-point table into which said second changing-point coordinate set corresponding to the bit pattern has been stored as to each of all bit patterns produceable by said blocks, when said binary image signal block is supplied from said subdividing means and said detection signal indicates "coincidence", said initial address of said second set of the changing-point coordinate corresponding to a bit pattern of said binary image signal block being outputted, and when said detection signal indicates "non-coincidence", said initial address of said first set of the changing-point coordinate corresponding to a bit pattern of said binary image signal block;

changing-point coordinate outputting means for producing an address used to access to said changing-point table based on said initial addresses derived from said index table, and also for reading a changing-point coordinate set corresponding to the bit pattern of the block supplied to said index table, thereby outputting said read changing-point coordinate set as a coordinate value of a changing point within a block; and converting means for converting said changing-point coordinate value derived from said changing-point coordinate outputting means into a changing-point coordinate of said binary image signal.

BRIEF DESCRIPTION OF THE DRAWINGS

For a better understanding of the present invention, reference is made of the detailed description to be read in conjunction with the accompanying drawings, in which:

FIG. 1 explanatorily shows a basic idea of a changing-point detecting apparatus for a binary image signal, according to the present invention;

FIG. 3 illustrates a content of an index table 4 employed in the changing-point detecting apparatus of FIG. 2;

FIG. 4 indicates a content of a changing point table (CPT) 6 employed in the changing-point detecting apparatus of FIG. 2;

FIG. 7 shows a content of another index table 4a employed in the changing-point detecting apparatus shown in FIG. 6;

FIG. 8A represent one portion of a content of another changing point table (CPT) 6a shown in FIG. 6; and FIG. 8B indicates the remaining portion of the content of the changing point table 6a indicated in FIG. 6.

DETAILED DESCRIPTION OF THE PREFERRED EMBODIMENTS

Figure 2:
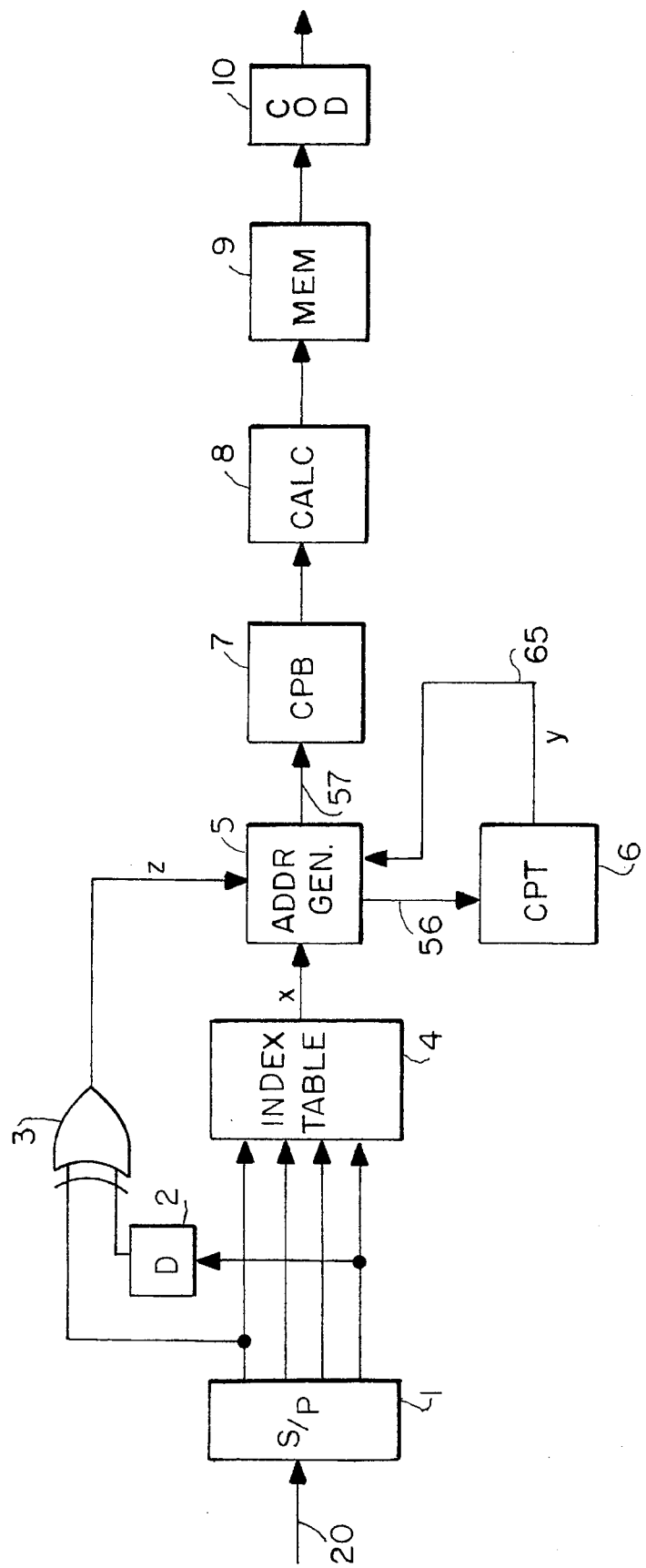
FIG. 2 is a schematic black diagram for representing an arrangement of the changing-point detecting apparatus according to a first preferred embodiment of the present invention.

Before describing various preferred embodiments of the present invention, a basic idea of a changing-point detecting apparatus for a binary image signal, according to the present invention, will now be explained.

Based upon the basic idea of the present invention, one horizontal scanning line of a binary image signal is subdivided into a plurality of blocks. With respect to "n" pieces ("n" being an integer) of pixels in the subdivided block, coordinates of changing points within the subdivided block are calculated. The coordinates of the changing points within this block are converted into coordinates of changing points on the horizontal scanning line, so that the changing-point coordinates are obtained. In accordance with the present invention, since the coordinates of the changing points are detected in units of blocks constructed of plural pixels, the changing points can be detected at higher speeds than that of the conventional detecting system.

Referring to FIG. 1, the basic idea of the present invention will be described more in detail. In FIG. 1, there is shown a relationship between a changing-point bit number and a pixel pattern produceable within such a block whose size (n) is selected to be 4. A column of input data in FIG. 1 indicates the pixel pattern, in which a pixel value on the left side corresponds to such a pixel value preceding another pixel value on the right side in view of time lapse. For instance, as to the pixel pattern "0100", at a second pixel, a pixel value thereof is changed from "0" into 1, whereas at the third pixel, a pixel value thereof is changed from "1" into "0".

Accordingly, coordinates of changing points within the block with respect to this pixel pattern are "2" and "3". Then, in FIG. 1, "2,3" are indicated in the column of changing-point bit number for indicating the changing point coordinates in the block of the pixel pattern "0100". It should be noted that the numeral values of this changing-point bit number column are represented in hexadecimal notation.

In another pixel pattern "0000" and a further pixel pattern "1111", coordinates in blocks 2,3,4 are not the changing points. Therefore, a coordinate value "F" (implies 15 in decimal notation) of a changing point which is not produceable in the block having the size of 4 is represented in the columns of the changing-point bit numbers corresponding to these pixel patterns.

If a table as shown in FIG. 1 is previously formed in the above-described manner and this table is accessed using the pixel patterns of the block as addresses, then the changing-point coordinates within the blocks other than the head pixels of the blocks can be detected. No detection is made as to whether or not the head pixel in each of the blocks corresponds to a changing point by accessing this table. In accordance with the present invention, it is therefore judged whether or not the head pixel in each of these blocks corresponds to a changing point by comparing the value of the head pixel in the present block with the value of the last pixel in the block located immediately before this present block.

As a consequence, the basic idea of the present invention has been summarized. Now, a changing-point detecting apparatus for a binary image signal, according to a first preferred embodiment of the present invention, will be described in detail with reference to FIG. 2, FIG. 3, FIG. 4 and FIG. 5.

First, FIG. 2 schematically shows an arrangement of the changing-point detecting apparatus according to the first embodiment of the present invention.

As illustrated in FIG. 2, this first changing-point detecting apparatus is constructed of a serial-to-parallel converter (S/P) 1 for serial/parallel-converting a binary image signal 20 entered from a signal source (not shown) into a binary image signal block having a size of 4, a delay circuit (D) 2 for delaying a value of the last binary image within this image signal block having the size of 4 by 1 block time, and an exclusive OR gate circuit 3 for exclusively OR-gating a value of the head binary image signal within this image signal block having the size of 4 and the value of the last binary image signal delayed by the delay circuit 2 to output a signal indicating whether or not the head pixel of the respective blocks corresponds to a changing point. The first changing-point detecting apparatus further includes an index table 4 for entering therein the binary image signal block derived from the serial/parallel converter 1 and for outputting an initial address (x) of a changing point table (CPT) 6 to be accessed, an address generator (ADDR GEN) 5 for generating an address 56 used to access to the changing point table 6, a changing point table 6 for previously storing coordinates of changing points, a changing point buffer (CPB) 7 for temporarily storing the coordinates of the changing points within the blocks derived from the address generator 5 and the changing point table 6, and a calculation circuit (CALC) 8.

Precisely speaking, the address generator 5 generates the access address 56 for the changing point table 6 in such a way that when the logic level of the output signal (z) from the exclusive OR gate circuit 3 is "1", the changing point coordinate "1" within the block is written into the changing point buffer (CPB) 7, whereas either after this changing point coordinate "1" has been written, or when the logic level of the output signal "z" from the exclusive OR gate circuit 3 is "0", the initial address read out from the index table 4 is used as a starting address and incremented by 1 until the value of the coordinate (y) derived from the changing point table 6 becomes "F". In the changing point table 6, all coordinates of the changing points within the block for all bit patterns produceable by the binary image signal block, except for the coordinate 1 within the block among these bit patterns, are stored at serial storage addresses in size order, and then the coordinate "y" of the changing point within the block stored therein is outputted based on the changing-point table accessing address generated from the address generator 5. Furthermore, the calculation circuit 8 reads the coordinate of the changing point within the block which has been temporarily stored in the changing point buffer 7, and then converts the read coordinate of the changing point into the corresponding changing-point coordinate within the horizontal scanning line.

It should be understood that when this first changing-point detecting apparatus is employed in such a binary image encoding apparatus as a facsimile machine, the changing-point address within the horizontal scanning line calculated in the calculation circuit 8 is once written into a memory (MEM) 9, and an encoder (COD) 10 performs the modified Huffman coding operation and the like by reading the changing-point address within the horizontal scanning line from the memory 9 (see FIG. 2).

The serial/parallel converter 1 serial/parallel-converts the inputted binary image signals into the 4-bit parallel image signals, so that the resultant image signals are outputted as a binary image signal block having a size of 4. The signal value of the head binary image signal among this 4-bit parallel image signal is supplied to the exclusive OR gate circuit 3, and the signal value of the final binary image signal is supplied to the delay circuit 2. The delay circuit 2 delays the entered signal value of the last binary image signal within the block by 1 block, and supplies this delayed last binary image signal into the exclusive OR gate circuit 3.

Since both of the head binary image signal value of the present block and the last binary image signal value of another block located immediately before the present block are supplied to be exclusively OR-gated by the exclusive OR gate circuit 3, this exclusive OR gate circuit 3 outputs a signal (z) for indicating whether or not the head pixel of the present block corresponds to a changing point. This signal (z) has an output level of "1" when the head pixel of each block corresponds to a changing point, and has an output level of "0" when the head pixel thereof does not correspond to a changing point. This output signal (z) is supplied to the address generator 5.

Then, the 4-bit parallel image signal, namely the binary image signal block outputted from the serial/parallel converter 1 is supplied to the index table 4. This index table 4 produces the address 56 for accessing to the changing point table 6 and this address 56 is furnished to the changing point table 6 for the accessing operation.

Referring now to FIG. 3 and FIG. 4, contents of the above-described index table 4 and changing-point table 6 will be explained.

FIG. 4 is a truth table indicative of the contents of the changing-point table 6. In this table 6, with respect to each of these bit patterns produceable by the binary image signal block, the coordinates of all the changing points within the block except for the head pixel are stored at the serial table addresses. At another table address used to separate a set of coordinates of the changing points belonging to the different bit patterns, a value "F" (hexadecimal) which can not be produced as the coordinate of the changing point within the block is written.

The contents of the changing-point table 6 will now be explained with several examples. As apparent from explanations about the index table (will be discussed later), for instance, an address "001011" of the changing-point table shown in FIG. 4 corresponds to a head address (namely, initial address) at which a coordinate set of changing points within a block corresponding to a bit pattern "0101" is stored. At this address "001011", a first changing-point coordinate "2" of the bit pattern "0101" except for the head pixel is stored. At addresses "001100" and "001101" subsequent to this address "001011", changing-point coordinates "3" and "4" subsequent to the previous changing-point coordinate "2" are written which are such coordinates of changing points within blocks corresponding to the bit pattern "0101". It should be noted that the changing-point coordinates within the blocks corresponding to the bit pattern "0101" are only "2", "3" and "4". At the subsequent address "001110", such a value for indicating that there is no longer any changing-point coordinate belonging to this bit pattern is written. That is, a value "F" indicative of such a symbol for separating the changing-point coordinate set belonging to the different bit patterns is written at this address "001110".

Furthermore, at another address "001111" subsequent to this address "001110", a first coordinate of a changing point of the changing-point coordinate (except for the head pixel) set corresponding to the bit pattern "0110" is stored. It should be noted that at initial addresses "000000" and "100111" corresponding to a bit pattern "0000" and a bit pattern "1111", the values "F" are written, since these bit patterns do not have any changing point other than the head pixels.

In the index table 4, as to the respective bit patterns, a head address of an area of such a changing-point table into which the changing-point coordinate set corresponding to this bit pattern has been stored is stored. FIG. 3 represents the contents of an index table which is utilized in combination with the changing-point table shown in FIG. 4. In response to the binary image signal block supplied from the serial/parallel converter 1, the index table 4 outputs an initial address (x) corresponding to a bit pattern of this block.

Figure 5:
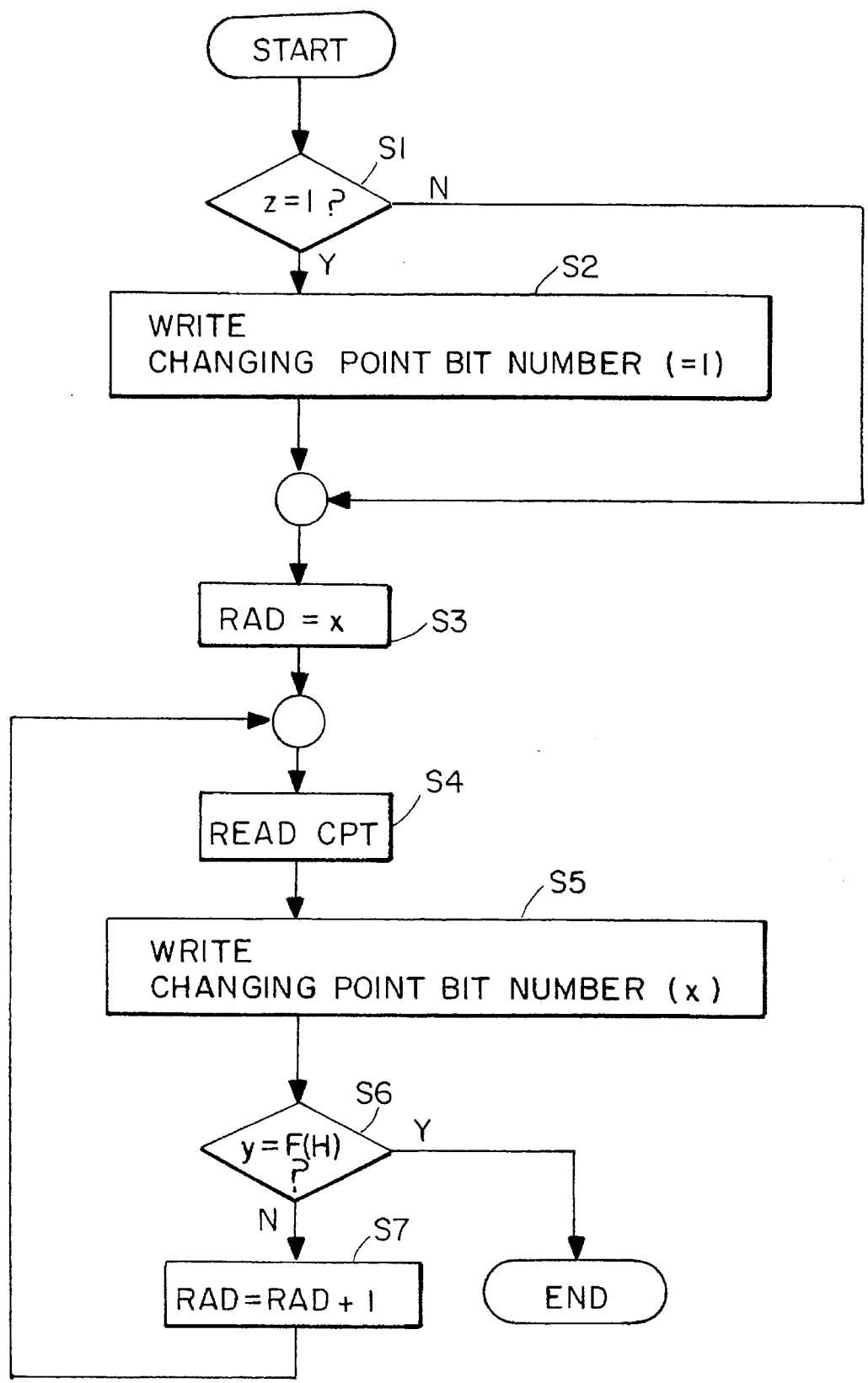
FIG. 5 is a flow chart for explaining operations of an address generator 5 employed in the changing-point detecting apparatus of FIG. 2.

In response to both of the signal (z) for indicating whether or not the head pixel of the binary image signal block supplied from the exclusive OR gate circuit 3 is the changing point and the initial address (x) supplied from the index table 4, the address generator 5 performs the below-mentioned operation. FIG. 5 is a flow chart for explaining this operation of the address generator 5. Referring now to this flow chart, the operation of the address generator 5 will be described.

At a first step S1 of this flow chart, the address generator 5 judges as to whether or not the logic level of the signal (z) outputted from the exclusive OR gate circuit 3 is equal to "1", namely whether or not the head pixel of the block corresponds to the changing point when it is so judged that the logic level of this signal (z) is equal to "1", the process operation of this address generator 5 is advanced to a step S2. At this step S2, the changing point bit number, i.e., "1" is written as the changing-point coordinate within the block into the changing-point buffer (CPB) 7 shown in FIG. 2. When either the process operation defined at the step S2 is completed, or it is so judged that the head pixel of the block does not correspond to the changing points, the process operation of the address generator 5 is advanced to an further step S3.

At this step S3, the address generator 5 sets the initial address (x) supplied from the index table 4 to a read address register (RAD) built therein. Next, at a step S4, the address generator 5 furnishes the value stored in this address register to the changing-point table 6 as the address 56 for accessing to the changing-point table, so that the changing-point coordinate (y) is read out to a signal line 65. This read changing-point coordinate (y) is written into the changing-point buffer 7. Then, at a step S6, the address generator 5 judges whether or not the value of the changing-point coordinate (y) read out from the changing-point table 6 corresponds to the value "F". As a judgement result, when the value of the changing-point coordinate (y) is equal to the value "F", the address generator 5 completes the process operation with respect to this binary image signal block. To the contrary, when the value of the changing-point coordinate (y) is not equal to the value "F", the process operation by the address generator 5 is advanced to the next step S7. At this step S7, the value of the read address register (RAD) is incremented by 1. When the process operation defined at this step S7 is ended, the process operation by the address generator 5 is returned to the previous step S4 at which such a process operation to read the changing-point coordinate from the changing point table 6 is commenced.

Now, the operations of the index table 4, address generator 5, and changing-point table 6 will be described with respect to this flow chart in an example when a bit pattern "0010" is outputted from the serial/parallel converter 1 as the present block. It is assumed that a pixel corresponding to the head bit of this bit pattern "0010" is equal to a changing point.

Upon supply of a bit pattern "1110", the index table 4 supplies "100101" as the initial address (x) to the address generator 5. Since the fact that the head pixel of the present block is the changing point has been given to the address generator 5, the judgement result by this address generator 5 at the step S1 becomes "YES". As a consequence, the process operation by the address generator is advanced to the step S2 at which the coordinate value "1" of the changing point within the block is written into the changing-point buffer 7. Subsequently, at the step S3, the initial address "100101" supplied from the index table 4 is set to the read address register (RAD). Then, the address generator accesses the changing-point table based on the changing-point table accessing address "100101" stored in the read address register, so that the coordinate value "4" of the changing point within the block is read out. Then, the read coordinate value "4" of the changing point within the block is written into the changing-point buffer 7.

At this time, since the judgement result at the step S6 becomes "NO", the address generator 5 increments the content of the read address register by 1 at the step S7, and then the process operation is returned to the step S4. At this step S4, the address generator 5 accesses the changing-point table 6 based on the changing-point table accessing address "100110" so as to read the value "F" from this table 6. Thereafter, this value "F" is written into the changing-point buffer 7 at the step S6. In this manner, the coordinate values "1", "4" of the changing points within the block, and the value "F", which correspond to the bit pattern "1110" of the present block are written into the changing-point buffer 7. At this time, the judgement result at the step S6 becomes "NO", so that the address generator 5 completes the process operation for detecting the changing-point coordinate with respect to the binary image of one block.

With the above-described description, the operations of the index table 4, address generator 5 and changing-point table 6 are accomplished.

As previously explained, the calculation circuit 8 converts the changing-point coordinate within the block which has been written into the changing-point buffer 7 by the address generator 5 into the corresponding changing-point coordinate within the horizontal scanning line. This coordinate conversion is carried out as follows:

First, based on a horizontal scanning start signal supplied via a signal line (not shown) to the calculation circuit 8, the calculation circuit 8 resets the block number M within the horizontal scanning line (M=0, 1, 2, ———) to zero. Then, the calculation circuit 8 reads out the value of the coordinate (y) within the block from the changing-point buffer 7, and executes the calculation as defined by the below-mentioned equation (1), thereby obtaining a coordinate value (μ) of a changing point within the horizontal scanning line:

$$U = M \times S + Y \tag{1}$$

where symbol "S" indicates a block size.

It should be noted that when the value "F" is read out from the changing-point buffer 7, this calculation circuit 8 does not execute this calculation by the equation (1), but increments the block number M by 1. Thus, the calculation circuit 8 calculates the coordinate value (μ) of the changing point within the horizontal scanning line, and thereafter supplies the calculation result to memory (MEM) 9 for the storage.

As also explained above, the encoder (COD) 10 reads the coordinate value (μ) of the changing point within the horizontal scanning line from the memory 9, and then encodes the binary image signal based on this coordinate value.

Another changing-point detecting apparatus, according to a second embodiment of the present invention, will now be explained with reference to FIG. 6, FIG. 7 FIG. 8A and FIG. 8B.

Figure 6:
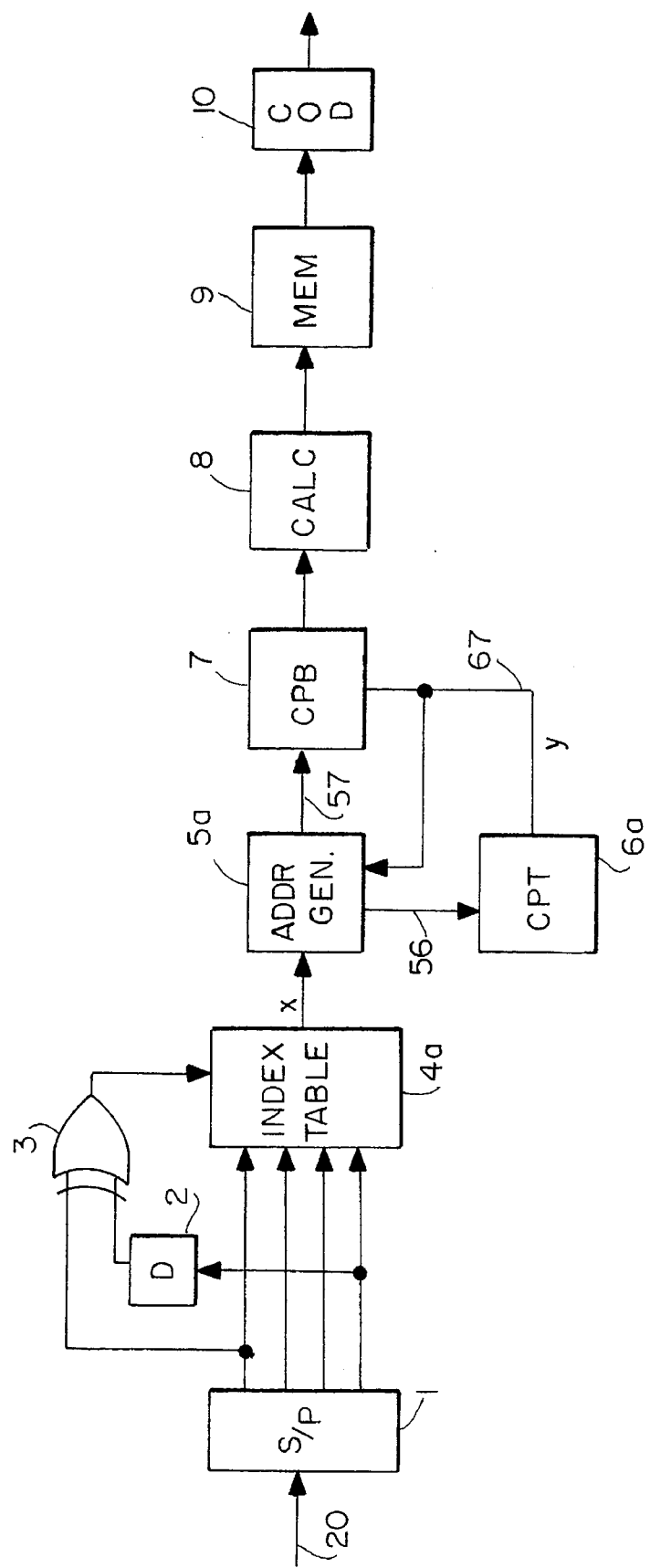
FIG. 6 is another block diagram of a changing-point detecting apparatus according to a second preferred embodiment of the present invention.

FIG. 6 schematically represents an arrangement of the changing-point detecting apparatus according to the second embodiment.

As illustrated in FIG. 6, this second changing-point detecting apparatus is constructed of a serial-to-parallel converter (S/P)1 for serial/parallel-converting a binary image signal 20 entered from a signal source (not shown) into a binary image signal block having a size of 4, and a delay circuit (D) 2 for delaying a value of the last binary image within this image signal block having the size of 4 by 1 block time, an exclusive OR gate circuit 3 for exclusively OR gating a value of the head binary image signal within this image signal block having the size of 4 and the value of the last binary image signal delayed by the delay circuit 2 to output a signal indicating whether or not the head pixel of the respective blocks corresponds to a changing point. The first changing-point detecting apparatus further includes an index table 4a for entering therein both the binary image signal block derived from the serial/parallel convertor 1 and the output signal (z) from the exclusive OR gate circuit 3, and for outputting an initial address (x) of a changing point table (CPT) 6 to be accessed, an address generator (ADDR GEN) 5a for generating an address 56 used to access the changing-point table 6, a changing-point table 6a for previously storing coordinates of changing points, a changing-point buffer (CPB) 7 for temporarily storing the coordinates of the changing points within the blocks derived from the address generator 5a and the changing point table 6, and a calculation circuit (CAL C) 8.

More specifically, the above-described address generator 5a generates the changing-point table accessing address 56 by incrementing an initial address derived from the index table 4 by 1, which is used as a starting address, until the output (y) from the changing-point table 6 becomes the value In the changing point table 6a, all coordinates of the changing points within the block for all bit patterns produceable by the binary image signal block are stored at serial storage addresses in size order, and then the coordinate "y" of the changing point within the block stored therein is outputted based on the changing-point table accessing address generated from the address generator 5a. Furthermore, the calculation circuit 8 reads the coordinate of the changing point within the block which has been temporarily stored in the changing point buffer 7, and then converts the read coordinate of the changing point into the corresponding changing-point coordinate within the horizontal scanning line.

As obvious from the above description of the arrangement shown in FIG. 6, in this second embodiment, the index table 4, address generator 5, and changing-point table 6 employed in the first embodiment are replaced by the above-explained index table 4a, address generator 5a, and changing-point table 6a. Further, although the output (z) of the exclusive OR gate circuit 3 is supplied to the address generator 5, this output (z) is furnished to the index table 4a.

As described above, since the index table 4a, the address generator 5a and the changing-point table 6a employed in the second embodiment are different from those of the first embodiment, only these different constructive elements will now be described and other constructive elements thereof are not explained.

FIG. 7 is a truth table indicating the content of this index table 4a. In an input column of FIG. 7, the most significant bit (MSB) of the input data corresponds to the output from the exclusive OR gate circuit 3, namely the signal (z) indicating whether or not the first pixel of the present block is equal to the changing point, and the lower 4 bits of this input data corresponds to the bit pattern of the present block having the size of 4, which is derived from the serial/parallel converter 1. On the other hand, the output column (x) of FIG. 7 represents an initial address of a changing-point set within a block, corresponding to a bit pattern. For example, a combination of an input "10111" and a value "1011001" of the output (x) column corresponding thereto represents that a changing-point set within a block, corresponding to such a bit pattern "0111" whose first pixel is a changing point, is stored at an address subsequent to the address "1011001" of the changing-point table 6a.

FIG. 8A and FIG. 8B are truth tables indicative of the content of the changing-point table 6a corresponding to the index table 6a shown in FIG. 7. That is, FIG. 8A indicates the content of the changing-point table corresponding to the left half portion of FIG. 7, and stores therein the coordinates of the changing points with the blocks for each of the block bit patterns when the head pixel of the present block is not equal to the changing point. FIG. 8B denotes the content of the changing-point table corresponding to the right half portion of FIG. 7, an stores therein the coordinates of the changing points within the blocks for each of the block bit patterns when the head pixel of the present block is equal to the changing point.

It should be noted that since the way to read the contents of the tables shown in FIG. 7, FIG. 8A and FIG. 8B is similar to that of FIG. 3 and FIG. 4, no explanations thereof are made in the following description.

Operations of the address generator 5a shown in FIG. 6 are a different from those of the first-mentioned address generator 5 indicated in FIG. 2. That is, in the flow operations of this address generator 5a, the process operations as defined at the steps S1 and S2 represented in FIG. 5 are no longer required. As apparent from the tables of FIG. 8A and FIG. 8B, in accordance with the second embodiment, both the changing-point coordinate set when the head pixel of the block is not equal to the changing point, and also the changing-point coordinate set when the head pixel of the block is equal to the changing point are stored in separate regions of the changing-point table 6a. As a consequence, the process operations defined at the steps S1 and S2 shown in FIG. 5 are not required in this second embodiment.

As previously described in detail, according to the present invention, since the changing points are detected in a block unit (namely, a plurality of pixels of the binary image signals are combined with each other to constitute a block), these changing points can be detected at higher speeds, as compared with the conventional changing-point detecting apparatus.

What is claimed is:

1. An apparatus capable of detecting a coordinate of a point where a value of a binary image signal is changed, comprising:

subdividing means for subdividing the binary image signal into blocks having a constant size, thereby outputting blocks of the binary image signal;

detecting means for comparing a value of the head pixel in one block of said binary image signal with a value of a last pixel in another block located just before said one block, thereby outputting a detection signal for indicating whether or not said head pixel value is coincident with said last pixel value;

a changing-point table having a substorage region for storing therein a set of changing-point coordinates within a block as to each of all bit patterns produceable by said binary image signal blocks, except for a coordinate of a head bit of said bit pattern;

an index table for storage therein an initial address of the substorage region of said changing-point table into which said changing-point coordinate set corresponding to the bit pattern has been stored as to each of all bit patterns produceable by said blocks, and for outputting the initial address when said binary image signal block is supplied from said subdividing means, said initial address corresponding to a bit pattern of said supplied binary image signal block;

changing-point coordinate outputting means for outputting a coordinate value within a block, which indicates that a head pixel is a changing point, as a changing-point coordinate value when the detection signal derived from said detecting means represents "coincidence", and for producing an address used access to said changing-point table based on said initial address derived from said index table, and also for reading a changing-point coordinate set corresponding to the bit pattern of the block supplied to said index table, thereby outputting said read changing-point coordinate set as a coordinate value of a changing point within a block; and converting means for converting said changing-point coordinate value derived from said changing-point coordinate outputting means into a changing-point coordinate of said binary image signal.

2. A changing-point coordinate detecting apparatus as claimed in claim 1 wherein;

said changing-point coordinate set of the changing-point table contains a coordinate value having a size value larger than said constant size at a last pixel.

3. A changing-point coordinate detecting apparatus as claimed in claim 2 wherein;

said converting means increments a block number by 1 every time the coordinate value having the size value larger than said constant size is received from said changing-point coordinate outputting means, and when another coordinate value other than said coordinate value having the size value larger than said constant size, for converting said coordinate value into said changing-point coordinate of the binary image signal based on both of a block number of said coordinate value and said constant size value.

4. An apparatus capable of detecting a coordinate of a point where a value of a binary image signal is changed, comprising:

subdividing means for subdividing the binary image signal into blocks having a constant size, thereby outputting blocks of the binary image signal;

detecting means for comparing a value of a head pixel in one block of said binary image signal with a value of a last pixel in another block located just before said one block, thereby outputting a detection signal for indicating whether or not said head pixel value is coincident with said last pixel value;

a changing-point table having a substorage region for storing therein a first set of changing-point coordinates within a block as to each of all bit patterns produceable by said binary image signal blocks, except for a coordinate of a head bit of said bit pattern, and another storage region for storing therein a second set of changing-point coordinates within a block as to each of all bit patterns produceable by said binary image signal blocks containing a head bit coordinate of said bit pattern;

an index table including a region for storing therein an initial address of the substorage region of said changing-point table into which said first changing-point coordinate set corresponding to the bit pattern has been stored as to each of all bit patterns produceable, by said blocks, and another region for storing therein another initial address of the substorage region of said changing-point table into which said second changing-point coordinate set corresponding to the bit pattern has been stored as to each of all bit patterns produceable by said blocks, when said binary image signal block is supplied from said subdividing means and said detection signal indicates "coincidence", said initial address of said second changing-point coordinate set corresponding to a bit pattern of said binary image signal block being outputted, and when said detection signal indicates "non-coincidence", said initial address of said first changing-point coordinate set corresponding to a bit pattern of said binary image signal block;

changing-point coordinate outputting means for producing an address used to access to said changing-point table based on said initial addresses derived from said index table, and also for reading a changing-point coordinate set corresponding to the bit pattern of the block supplied to said index table, thereby outputting said read changing-point coordinate set as a coordinate value of a changing point within a block; and converting means for converting said changing-point coordinate value derived from said changing-point coordinate outputting means into a changing-point coordinate of said binary image signal.

5. A changing-point coordinate detecting apparatus as claimed in claim 4 wherein:

said changing-point coordinate set of the changing-point table contains a coordinate value having a size value larger than said constant size at a last pixel.

6. A changing-point coordinate detecting apparatus as claimed in claim 5 wherein:

said converting means increments a block number by 1 every time the coordinate value having the size value larger than said constant size is received from said changing-point coordinate outputting means, and when another coordinate value other than said coordinate value having the size value larger than said constant size, for converting said coordinate value into said changing-point coordinate of the binary image signal based on both of a block number of said coordinate value and said constant size value.

* * * * *